C. H. CASEY.
IMPALEMENT TRAP.
APPLICATION FILED FEB. 9, 1916.
1,194,954.
Patented Aug. 15, 1916.
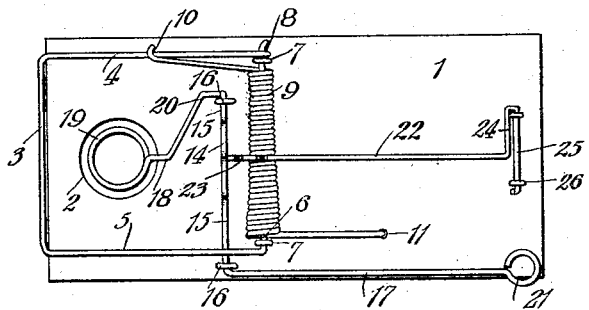
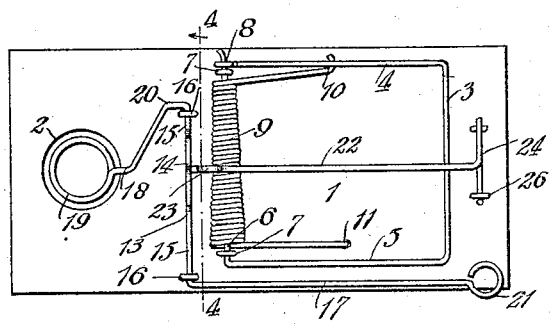
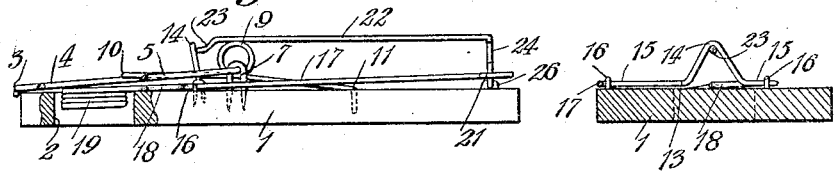
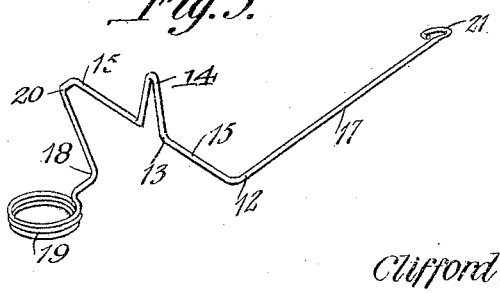
Clifford H. Casey,
Inventor
By Geo. P. Kimmel.
Attorney

UNITED STATES PATENT OFFICE.

CLIFFORD H. CASEY, OF MINNEAPOLIS, MINNESOTA.

IMPALEMENT-TRAP.

1,194,954.        Specification of Letters Patent.        Patented Aug. 15, 1916.

Application filed February 9, 1916. Serial No. 77,270.

*To all whom it may concern:*

Be it known that I, CLIFFORD H. CASEY, a citizen of the United States, residing at Minneapolis, in the county of Hennepin and State of Minnesota, have invented certain new and useful Improvements in Impalement-Traps, of which the following is a specification.

The present invention relates to animal traps, and more particularly to new and useful improvements in that class of traps known as impalement traps.

An object of this invention is to provide a new and improved trap having a simple and cheap locking means and bait holder, means being associated therewith, whereby the trap may be set with safety.

A further object of this invention is to provide a trap having an improved catch which remains in a position which will facilitate the setting of the trap without the necessity of grasping the catch and engaging it with the tripping mechanism, which is necessary in the devices heretofore offered.

Other objects of this invention as well as its advantages will be apparent from the following detail description and the claims, taken with an inspection of the accompanying drawing, in which—

Figure 1 is a top plan view of my improved trap in non-set position. Fig. 2 is a similar view of the trap in set position. Fig. 3 is a side elevation of my improved trap in non-set position, a portion of the trap base being broken away. Fig. 4 is a transverse sectional view taken on the line 4—4 of Fig. 2, and Fig. 5 is an enlarged perspective view of the improved bait holder and trip.

Referring more particularly to the drawing, wherein similar characters of reference designate like and corresponding parts throughout the various views, 1 designates the base of my improved trap having an opening 2 therethrough adjacent one end thereof for a purpose which will hereinafter appear.

The gripping member which may be of the usual type, comprises preferably, a U-shaped jaw or impalement member designated 3 in its entirety, having side portions 4 and 5, the portion 5 being extended and bent to form a transverse hinge portion 6 mounted in position by means of staples or the like 7, the free extremities of the hinge portion 6 and side portion 4 being permanently connected as at 8. An actuating means for the jaw 3 is provided, and comprises a coiled spring 9 having one extremity connected with the side 4 of the jaw as at 10, and the opposite extremity engaged with the base, as at 11. The structure described in the foregoing is of the type now in use, and forms no essential part of my invention, but has been described in order to make clear the application of my invention.

My invention embodies broadly, means for setting and maintaining set the trap, and includes a jaw holding member, a bait holder, a catch, and a member for facilitating the setting of the trap. The catch member is preferably formed of a strand of wire 12 having a transverse portion 13 provided with a tapering offset portion 14 forming a catch and provided with bearings 15, staples 16 serving to maintain the device on the base 1. The extremities of the strand of wire 12 are bent at right-angles to the portion 13 to provide a setting arm 17 and bait holding arm 18, having a bait holder 19 thereon formed by coiling the wire, the arm 17 being angularly offset as at 20 to bring the bait holder 19 into position in the opening 2. A loop 21 is formed on the arm 17 to provide a finger engaging portion.

The jaw holding member of my invention is formed preferably from a strand of wire 22 having an offset catch engaging portion 23 on one end and formed on the opposite end with a rectangular portion 24 forming a bearing, the lower arm 25 of which is mounted in staples or the like 26.

When setting my improved trap the base is carried in one hand. The jaw holding member is then thrown back, and the jaw swung back against the tension of the spring 9 into the position shown in Fig. 2. The jaw is now held in this position and the holding member 22 brought over until the end 23 thereof engages under the catch portion 14 of the catch member. The catch may be brought into engagement with the holding member by depressing the setting arm 17. The bait is placed in the trap either before or after setting, the arm 17 permitting the latter. When an animal touches the bait in the bait holder 19, the latter is depressed moving the catch out of engagement with the jaw holding member and allowing the trap to spring. I desire to lay particular stress upon the simplicity of the structure described, specifically concerning the bait holder catch and setting arm. Attention is also directed to the rectangular end of the jaw holder which prevents the latter from moving laterally out of the path of the catch. The arrangement of the reset arm obviates the necessity of placing the fingers in the path of movement of the jaw, which practice in the present device often results in injury to the person so doing.

From the above description taken in connection with the accompanying drawings, it is thought that a clear and comprehensive understanding of the construction, operation and advantages of my invention may be had, and while I have shown and described my invention as embodying a specific structure, I desire that it be understood that I may make such changes on said structure as do not depart from the spirit and scope of the invention as described.

What I claim as my invention and desire to secure by Letters Patent is:

1. The combination with a trap having a pivoted impalement jaw and a holding member for said jaw, of a catch member formed of a single strand of wire having a transverse bearing portion offset to provide a portion for engagement with the holding member, the opposite extremities of said strand being arranged in right-angular relation to said bearing portion, and formed to provide a bait holder and setting arm respectively.

2. In a trap, a gripping jaw, a holding arm therefor, said arm being pivoted whereby to prevent its lateral displacement, holding and tripping means for the trap formed of a strand of wire having a setting arm and a bait holder on the extremities thereof, and a catch member formed on the intermediate portion of the strand for engagement with the holding arm to set the trap.

In testimony whereof I affix my signature hereto.

CLIFFORD H. CASEY.

Copies of this patent may be obtained for five cents each, by addressing the "Commissioner of Patents, Washington, D. C."